(No Model.)
C. H. MEAD, Jr.
TAIL PIECE AND REIN PROTECTOR FOR HARNESS.
No. 272,895. Patented Feb. 27, 1883.
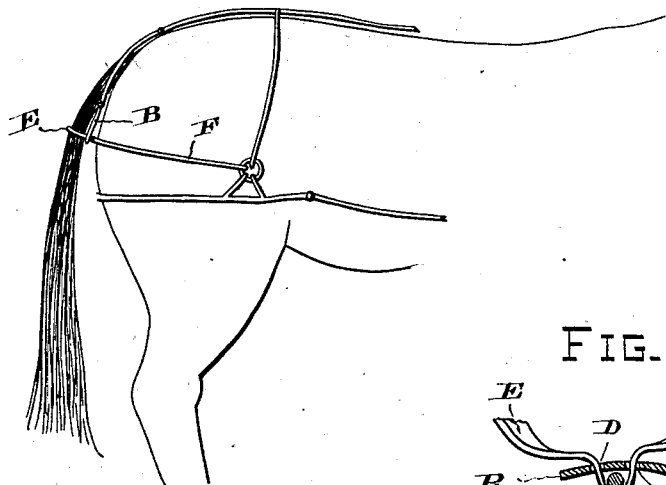
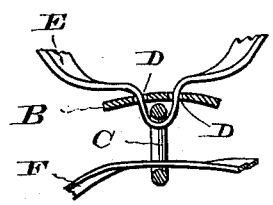
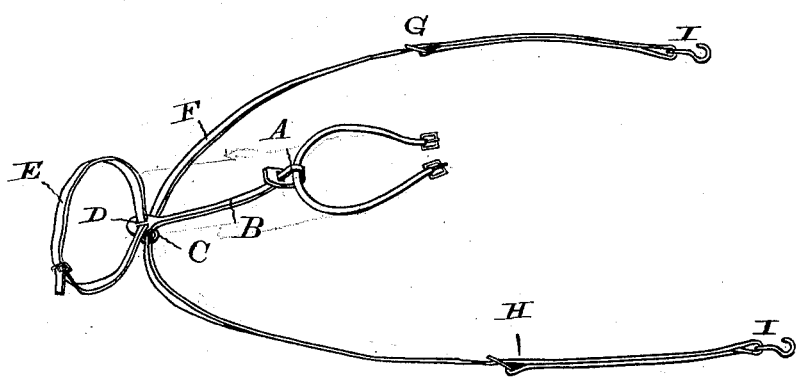
WITNESSES
Wilmer Bradford
Eddie Derby
INVENTOR
Charles H. Mead Jr
By C. Wm Smith
Attorney.

UNITED STATES PATENT OFFICE.

CHARLES H. MEAD, JR., OF SAN FRANCISCO, CALIFORNIA.

TAIL-PIECE AND REIN-PROTECTOR FOR HARNESS.

SPECIFICATION forming part of Letters Patent No. 272,895, dated February 27, 1883.

Application filed November 20, 1882. (No model.)

*To all whom it may concern:*

Be it known that I, CHARLES H. MEAD, Jr., a citizen of the United States, residing at San Francisco, in the county of San Francisco and State of California, have invented a new and useful Tail-Piece and Rein-Protector for Harnesses of Horses, of which the following is a specification.

It is a well-established fact that in driving harnessed horses the tail oftentimes becomes entangled in the reins, which causes the driver to lose control of the reins and thereby permit the animal to run away. Hence the object of my invention is to so construct and arrange a tail-piece for harnesses that all such accidents will be prevented. I accomplish this by the means illustrated in the accompanying drawings, in which—

Figure 1 is a side view, showing the device in position. Fig. 2 is a perspective view, and Fig. 3 is a detail view.

Similar letters refer to similar parts throughout the several views.

To the crupper of the harness I connect, by means of a loop, A, the strap B. This strap passes down along the under side of the tail of the horse and terminates upon a connecting-ring, C. Slips or slits D are made in the end of the strap B, through which is passed the right-angled tail-strap E, which tail-strap takes in the ring C, and forms a loop around the said ring C, and passes up through the slits in the tail-strap, and thus keeps both the straps B and E in proper position, and prevents the strap E from wearing downward when confined around the tail of the horse. I then connect the holding-strap F, which is provided with take-up loops and buckles G H at each end, by passing the strap through the ring C, in which position it has free play. Snap-hooks I I are connected to the outer ends of the rump or holding strap F, which hook into the side rings of the breeching of the harness, as shown.

In practice the loop A at the end of the strap B is passed around the crupper-stock and the strap extended down along the under side of the tail of the animal, when the right-angled tail-strap is buckled around the tail underneath the hair and out of sight, and then the side straps are hooked into the rings of the harness at each side of the horse, passing diagonally down the rump, in which position the tail of the animal is prevented from being switched to such an extent as would catch the reins.

Having thus described my invention, what I claim, and desire to secure by Letters Patent, is—

In a rein-protector and tail-piece for harness, the combination of the crupper-strap B, having slits D, the tail-strap E, ring C, and holding-straps F F, all constructed and arranged as and for the purpose described.

In testimony that I claim the foregoing I have hereunto set my hand and seal this 8th day of November, 1882.

CHARLES H. MEAD, JR. [L. S.]

Witnesses:
CHAS. E KELLY,
WILMER BRADFORD.